(12) United States Patent
Katsumata et al.

(10) Patent No.: US 11,619,868 B2
(45) Date of Patent: Apr. 4, 2023

(54) PROJECTION DEVICE

(71) Applicant: Yazaki Corporation, Tokyo (JP)

(72) Inventors: Yasuhiro Katsumata, Shizuoka (JP); Hitoshi Kodama, Shizuoka (JP); Yusuke Sugiura, Shizuoka (JP); Katsuyoshi Itahana, Shizuoka (JP); Kohji Matsuura, Shizuoka (JP); Yu Kobayashi, Shizuoka (JP); Yuki Miyoshi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/668,370

(22) Filed: Feb. 9, 2022

(65) Prior Publication Data
US 2022/0269153 A1 Aug. 25, 2022

(30) Foreign Application Priority Data
Feb. 12, 2021 (JP) .............................. JP2021-020344

(51) Int. Cl.
*G02B 27/01* (2006.01)
*B60K 35/00* (2006.01)
*G03B 21/14* (2006.01)

(52) U.S. Cl.
CPC ................................. *G03B 21/145* (2013.01)

(58) Field of Classification Search
CPC .. G02B 27/0149; G03B 21/145; G03B 21/14; B60K 35/00; B60K 2370/1529; B60K 2370/693
See application file for complete search history.

(56) References Cited

U.S. PATENT DOCUMENTS

| 5,452,179 A | 9/1995 | Sasaki |
| 2021/0215934 A1 | 7/2021 | Mizuochi |
| 2022/0244534 A1* | 8/2022 | Stanger .................. B60K 35/00 |

FOREIGN PATENT DOCUMENTS

| JP | H03-134718 A | 6/1991 |
| JP | 2009-37753 A | 2/2009 |
| JP | 2019-152795 A | 9/2019 |
| WO | 2020/009092 A1 | 1/2020 |

\* cited by examiner

*Primary Examiner* — Ryan D Howard
(74) *Attorney, Agent, or Firm* — Kenealy Vaidya LLP

(57) ABSTRACT

A projection device includes a housing including a wall part including an opening, and a cover with a plate shape having a light-transmitting property and closing the opening. The wall part includes a pair of edge parts facing each other with the opening therebetween and extending along a first direction, and a plurality of claw parts disposed at each of the pair of edge parts. The pair of edge parts is curved to the inside of the housing. The cover includes through holes disposed correspondingly to the claw parts. The claw part includes a base part protruding from the corresponding edge part and a holding part protruding from the base part along the first direction. The housing sandwiches and holds the cover between an edge part and the holding parts inserted into the through holes in a state where the cover is curved.

20 Claims, 17 Drawing Sheets

PROJECTION DEVICE

CROSS-REFERENCE TO RELATED APPLICATION(S)

The present application claims priority to and incorporates by reference the entire contents of Japanese Patent Application No. 2021-020344 filed in Japan on Feb. 12, 2021.

BACKGROUND OF THE INVENTION

1. Field of the Invention

The present invention relates to a projection device.

2. Description of the Related Art

Conventionally, devices for projecting images have been used. Japanese Patent Application Laid-open No. 2019-152795 discloses a head-up display device including a liquid crystal display panel emitting display light and a light-transmitting cover member transmitting the display light. The light-transmitting cover member according to Japanese Patent Application Laid-open No. 2019-152795 is formed curved along a second reference axis in a state of being bonded to a case so as to close an opening part of the case.

A projection device for projecting an image is desired to include as few components as possible. The number of components can be reduced if a cover can be fixed to a housing without the use of an adhesive agent or an adhesive tape.

SUMMARY OF THE INVENTION

It is an object of the present invention to provide a projection device that can be structured with fewer components.

In order to achieve the above mentioned object, a projection device according to one aspect of the present invention includes a housing including a wall part including an opening that allows display light to pass toward outside; and a cover with a plate shape having a light-transmitting property and closing the opening from the outside, wherein the wall part includes a pair of edge parts facing each other with the opening therebetween and extending along a first direction, and a plurality of claw parts disposed along the first direction at each of the pair of edge parts, the pair of edge parts is curved to inside of the housing, the cover includes a plurality of through holes disposed correspondingly to the claw parts, each of the claw parts includes a base part protruding from the edge part toward the outside and a holding part protruding from a tip end part of the base part along the first direction, and the housing sandwiches the cover between the edge parts and the holding parts inserted into the through holes and holds the cover in a state where the cover is curved.

According to another aspect of the present invention, in the projection device, it is preferable that the claw parts disposed along each of the edge parts include a first claw part positioned at an end part in the first direction, and a length of the holding part of the first claw part is larger than a length of the holding part of the claw part other than the first claw part.

According to still another aspect of the present invention, in the projection device, it is preferable that the first claw part is positioned at an end part in a protruding direction in which the holding part protrudes.

According to still another aspect of the present invention, in the projection device, it is preferable that the cover includes a first side that is a side facing toward a direction opposite to the protruding direction in which the holding part protrudes, and the housing includes a covering part that covers the first side in a state where the cover is held by the holding parts and the edge parts.

According to still another aspect of the present invention, in the projection device, it is preferable that the cover includes a positioning hole, and the housing includes a first protrusion to be fitted to the positioning hole in a state where the cover is held by the holding parts and the edge parts.

According to still another aspect of the present invention, in the projection device, it is preferable that the cover includes a notch provided at a first side that is a side facing toward a direction opposite to the protruding direction in which the holding part protrudes, and the housing includes a second protrusion that locks the notch so as to position the cover.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A projection device according to an embodiment of the present invention is hereinafter described in detail with reference to the drawings. The present invention is not limited by this embodiment. The components in the embodiment below include components that are easily conceivable by a person skilled in the art and substantially equivalent components.

Embodiment

Figure 1:
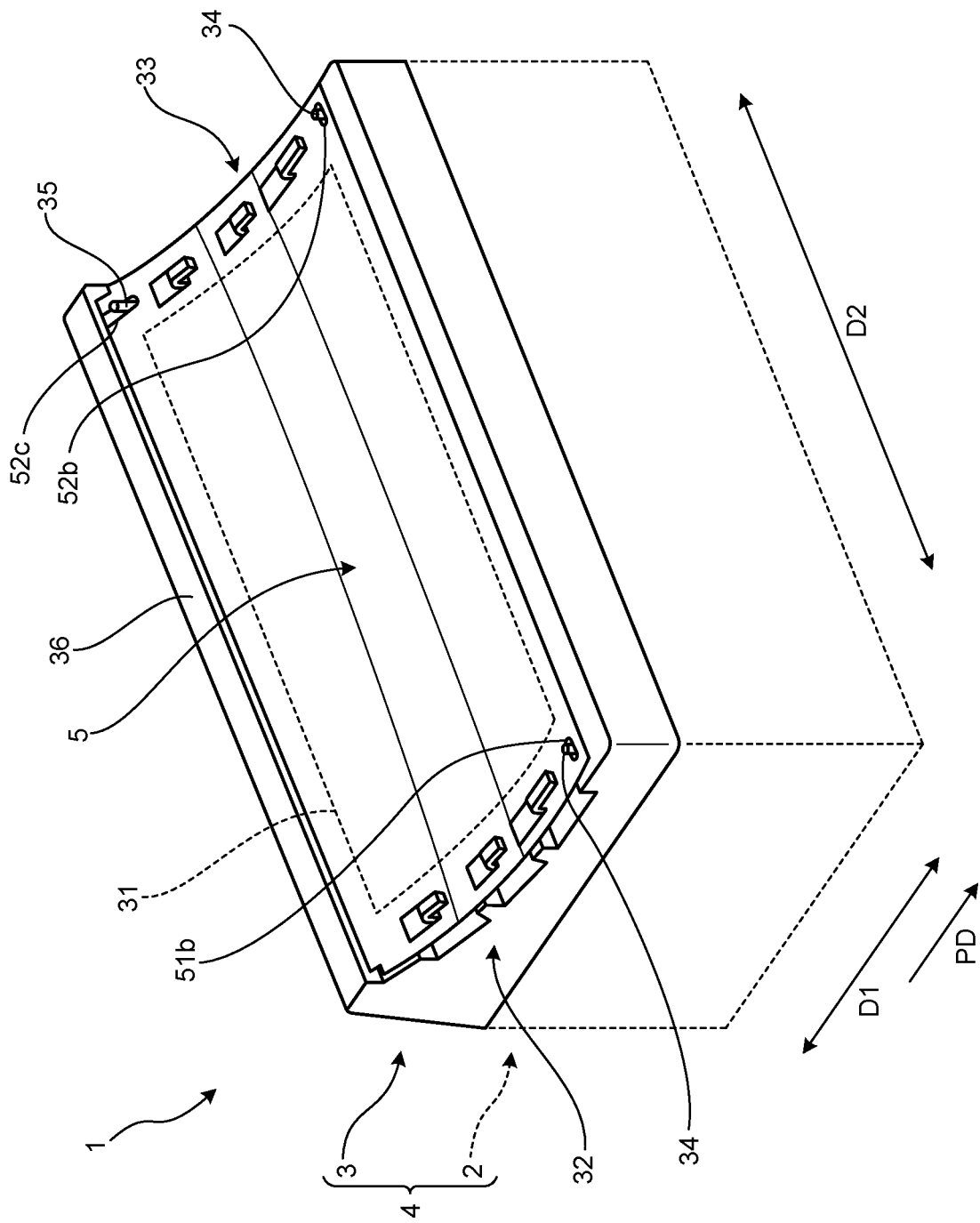
FIG. 1 is a perspective view of a projection device according to an embodiment.
Figure 2:
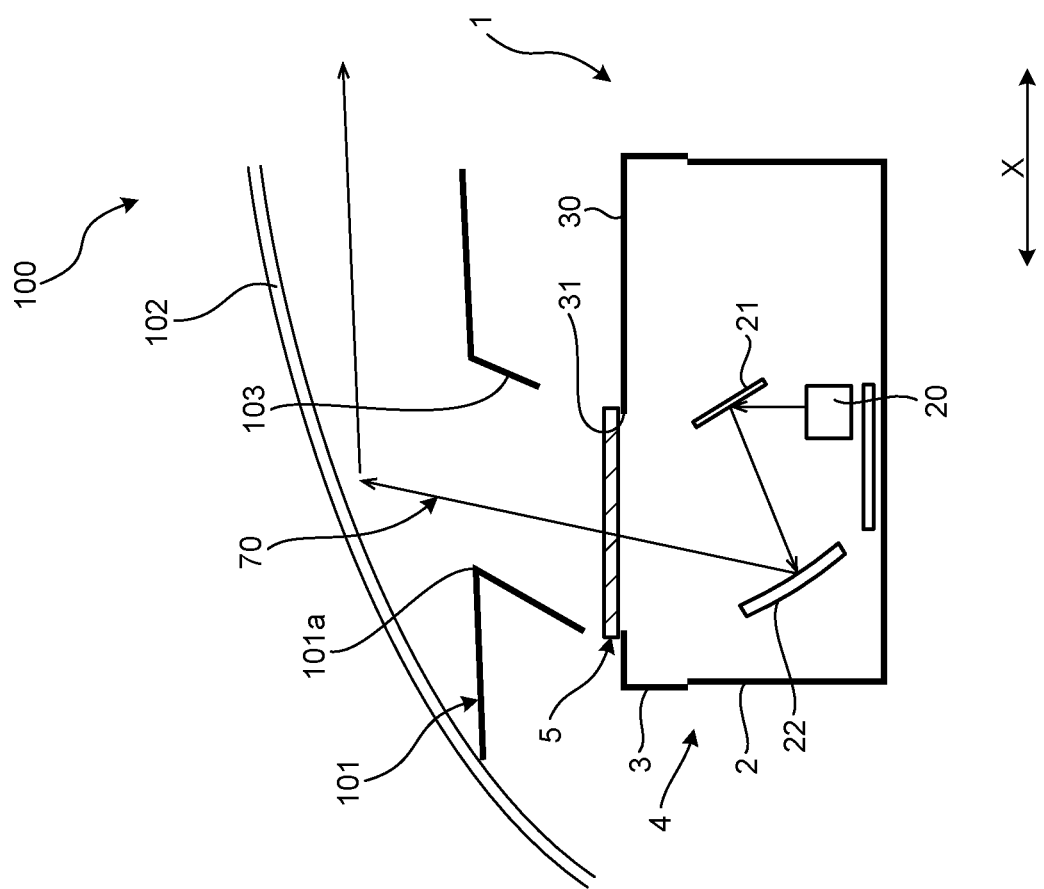
FIG. 2 is a schematic structure diagram of a vehicle where the projection device according to the embodiment is mounted.
Figure 3:
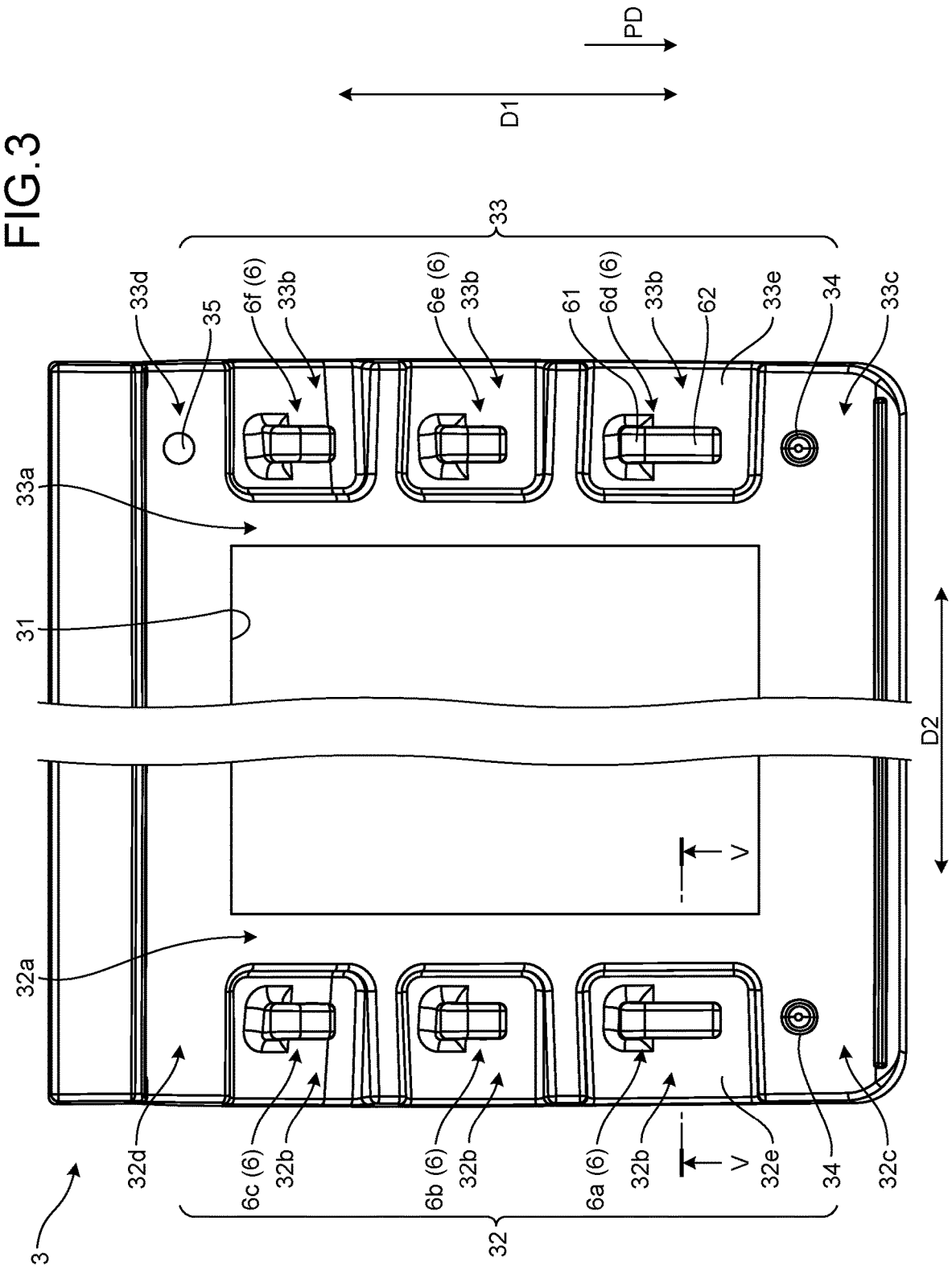
FIG. 3 is a plan view of a housing according to the embodiment.
Figure 4:
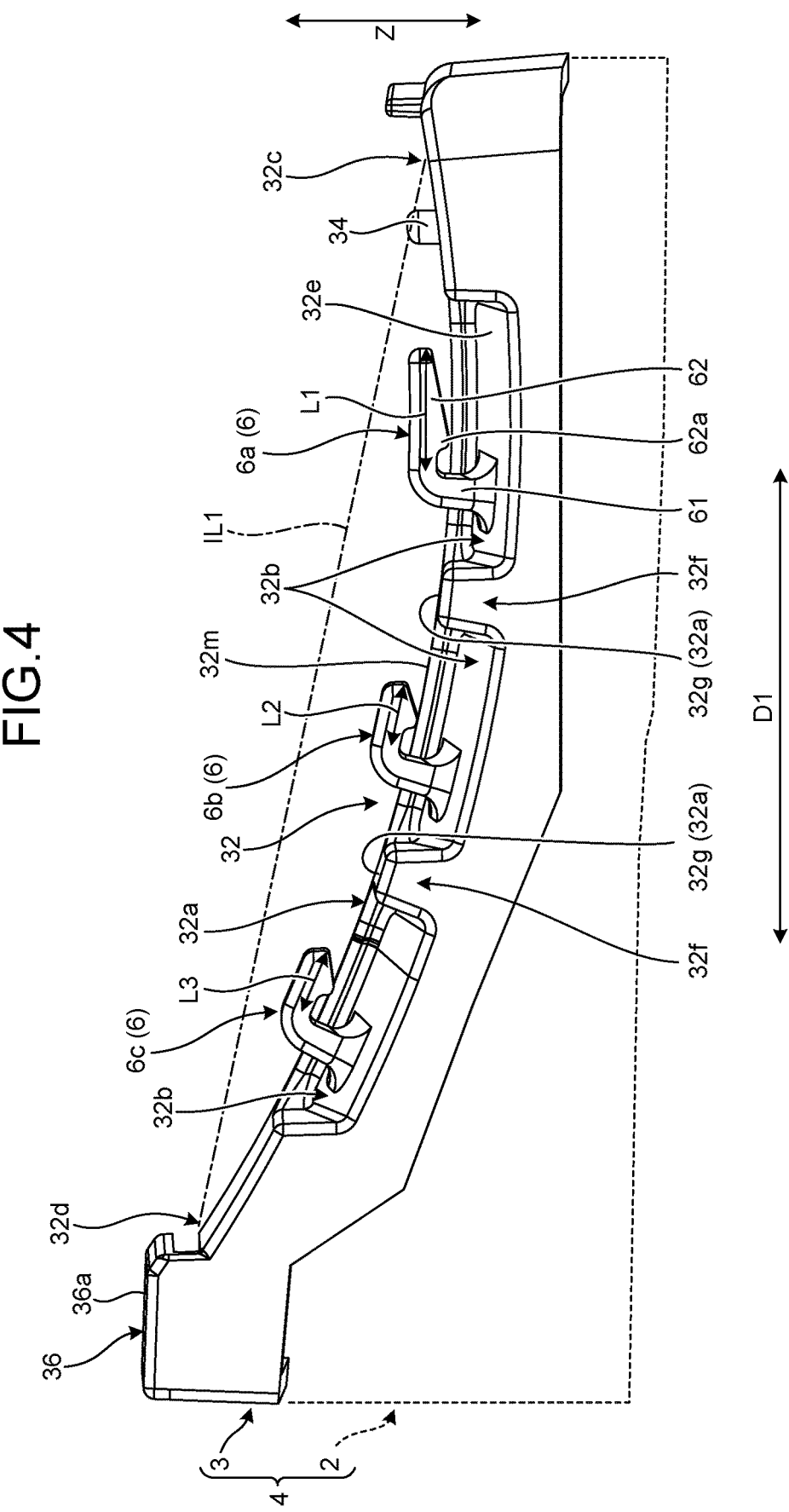
FIG. 4 is a side view of the housing according to the embodiment.
Figure 5:
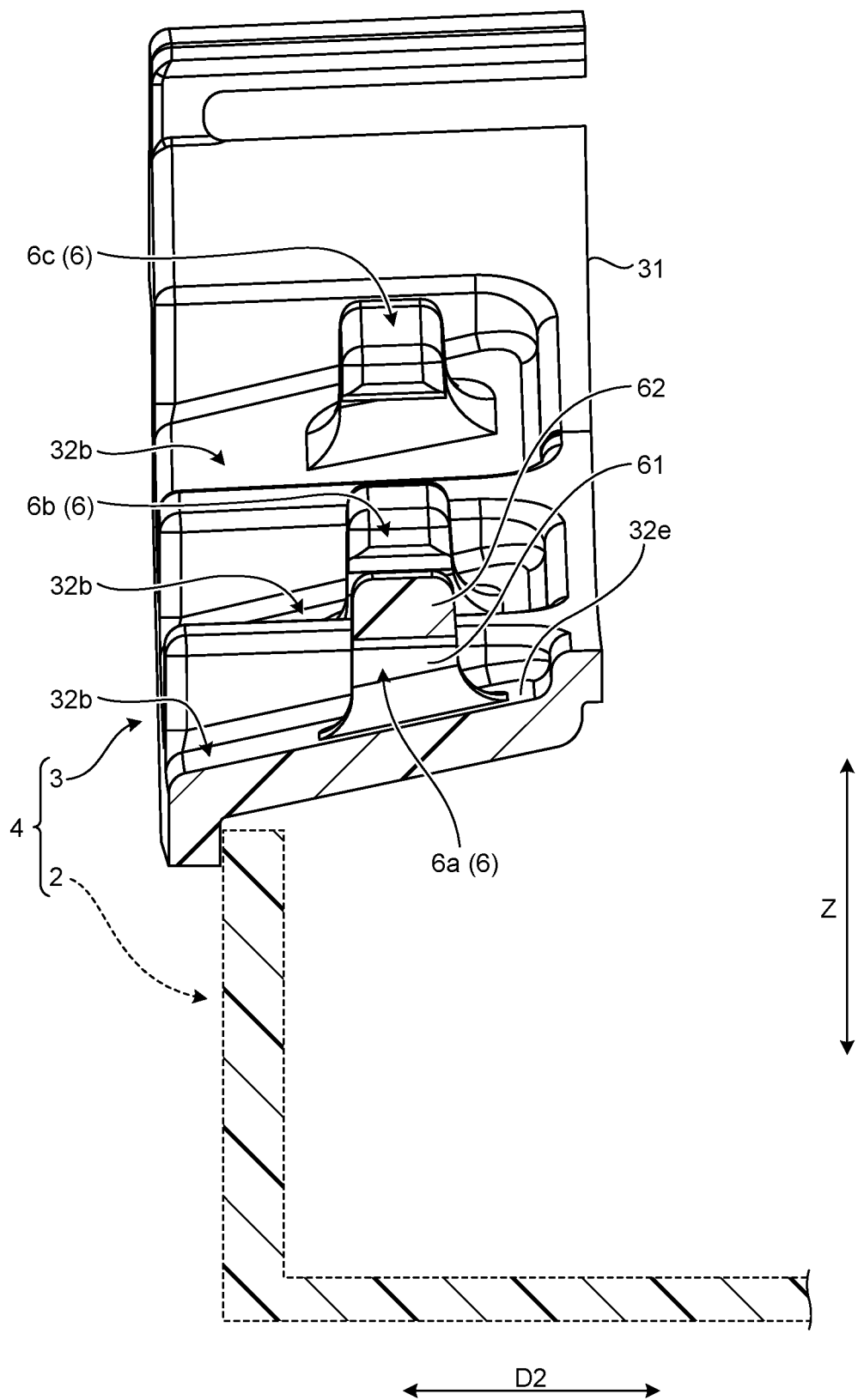
FIG. 5 is a sectional view of the housing according to the embodiment.
Figure 6:
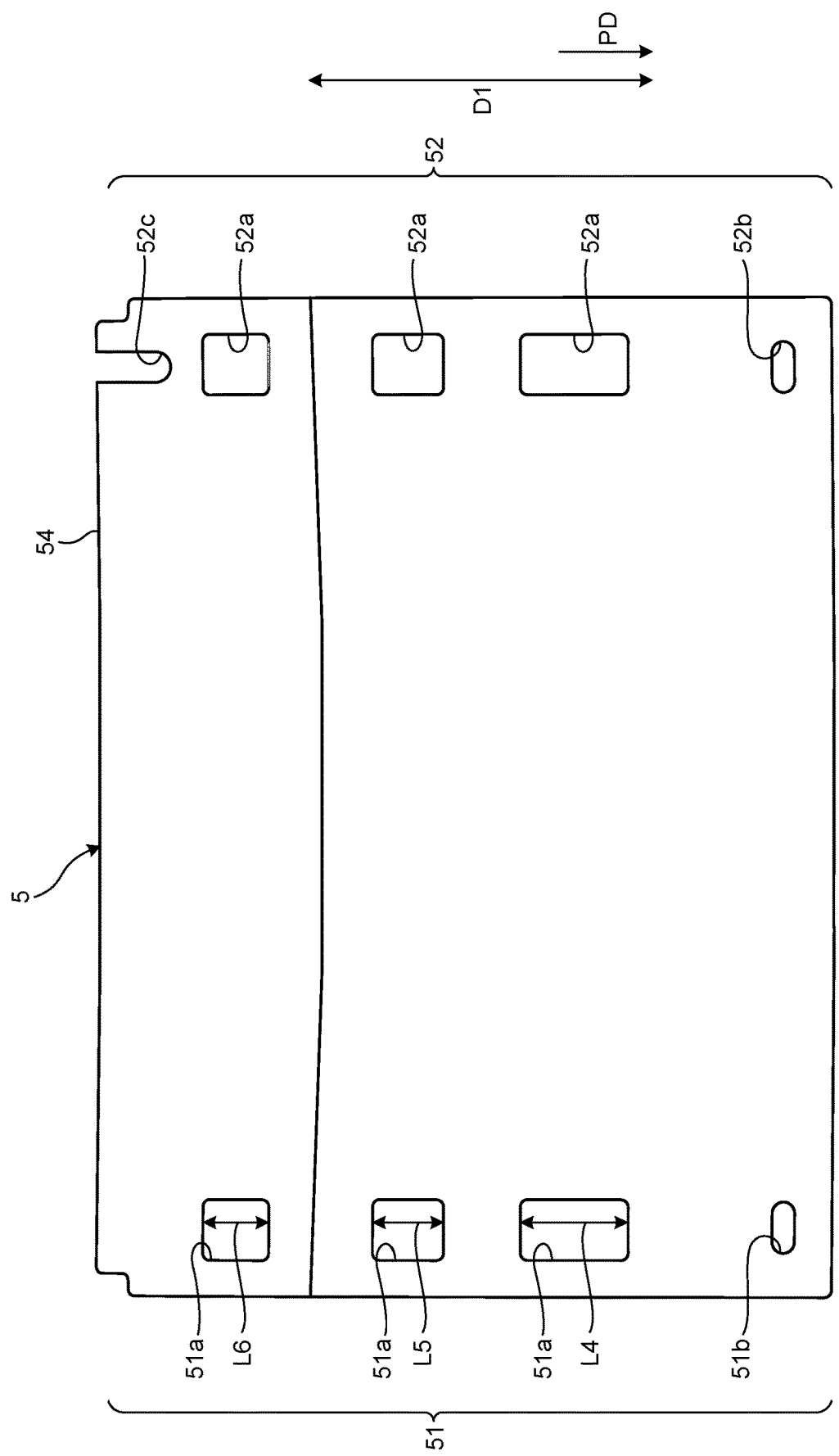
FIG. 6 is a plan view of a cover according to the embodiment.
Figure 7:
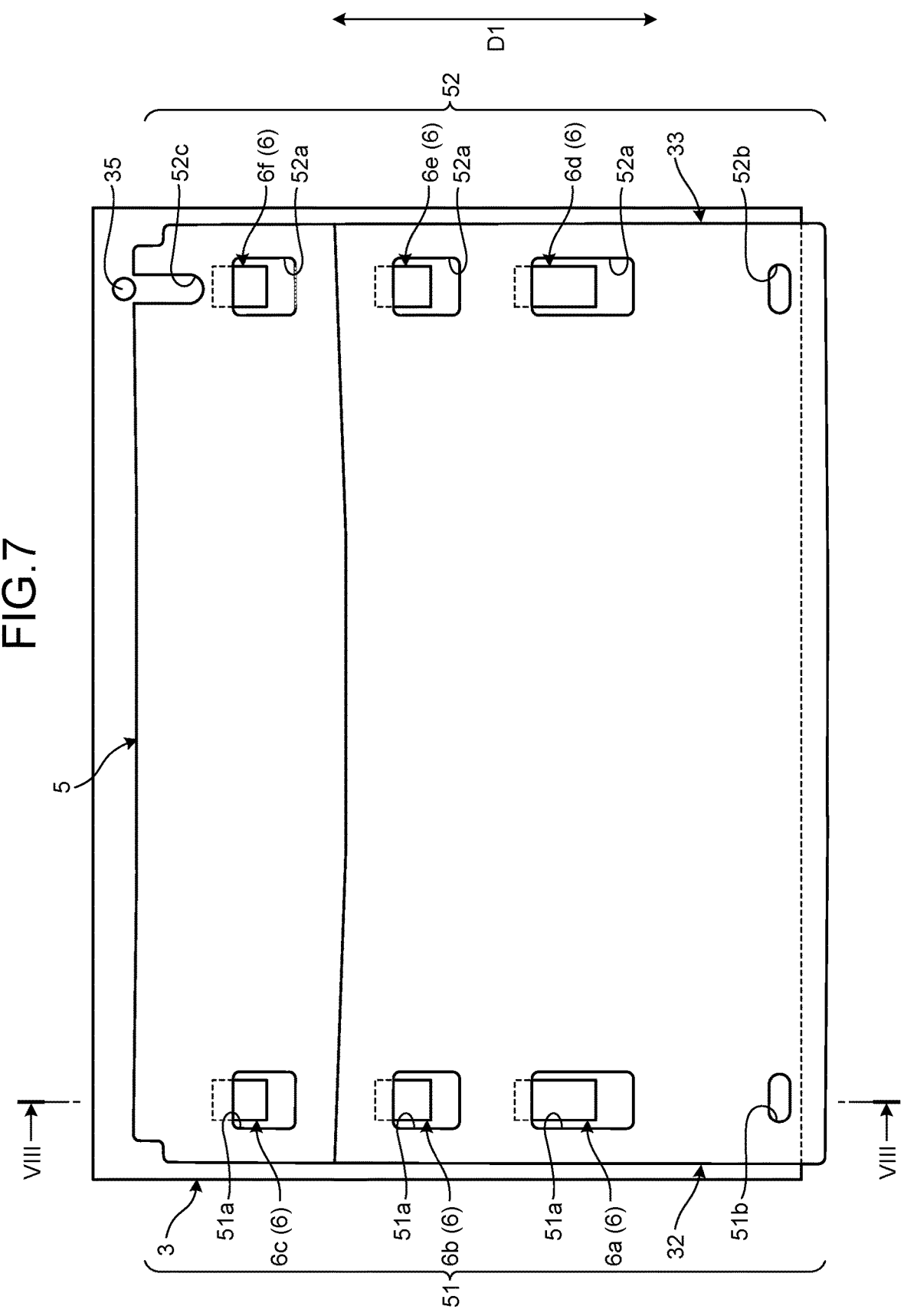
FIG. 7 is a plan view for describing the attachment of the cover to the housing.
Figure 8:
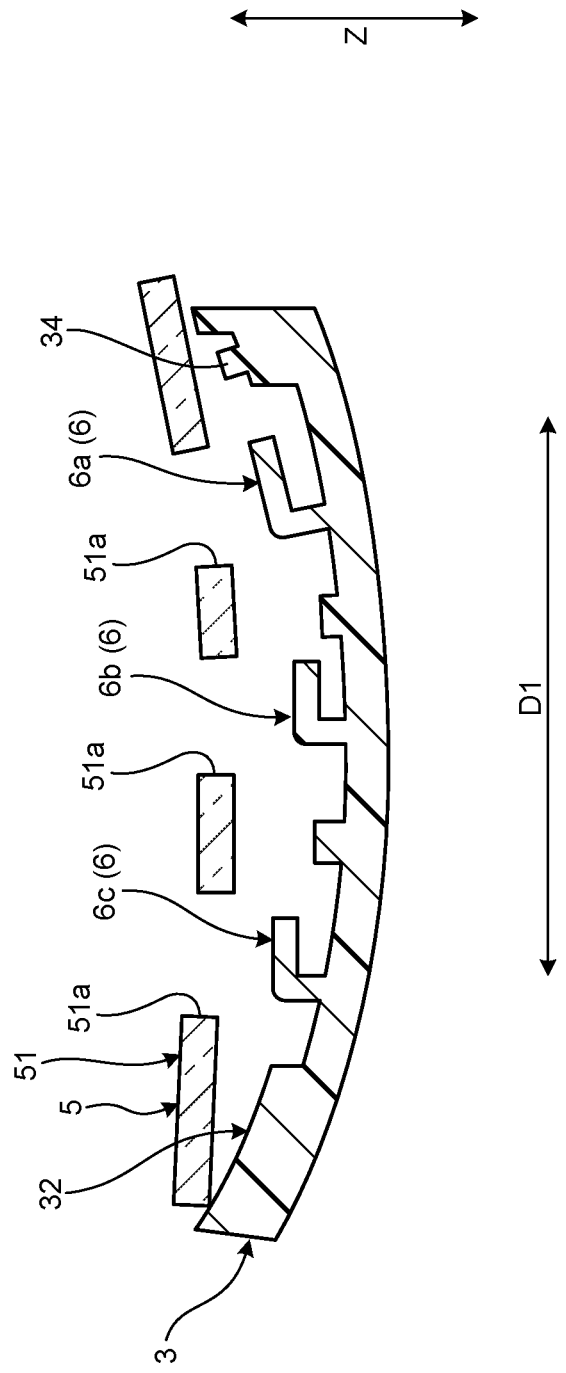
FIG. 8 is a sectional view for describing the attachment of the cover to the housing.
Figure 9:
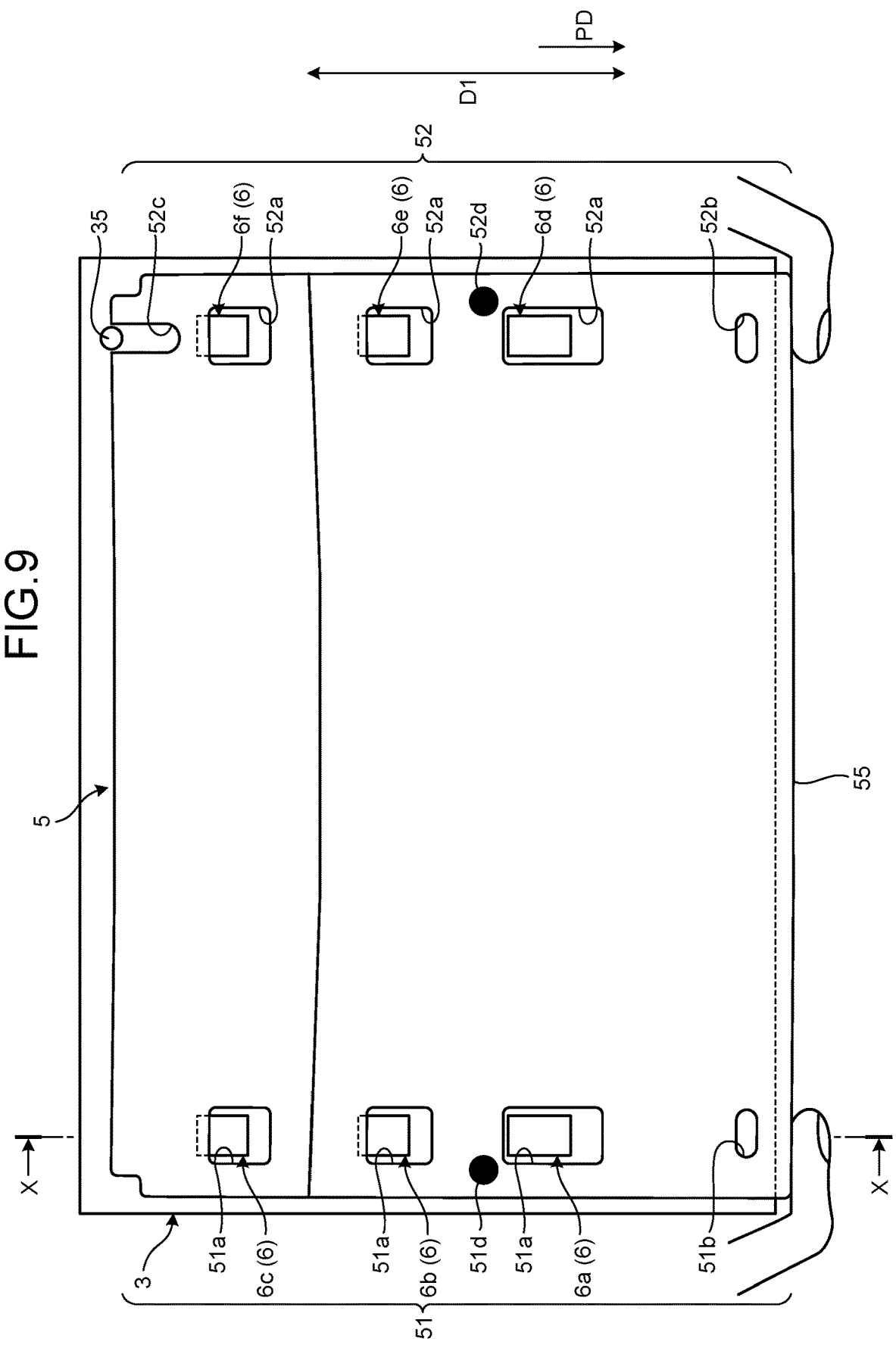
FIG. 9 is a plan view for describing the attachment of the cover to the housing.
Figure 10:
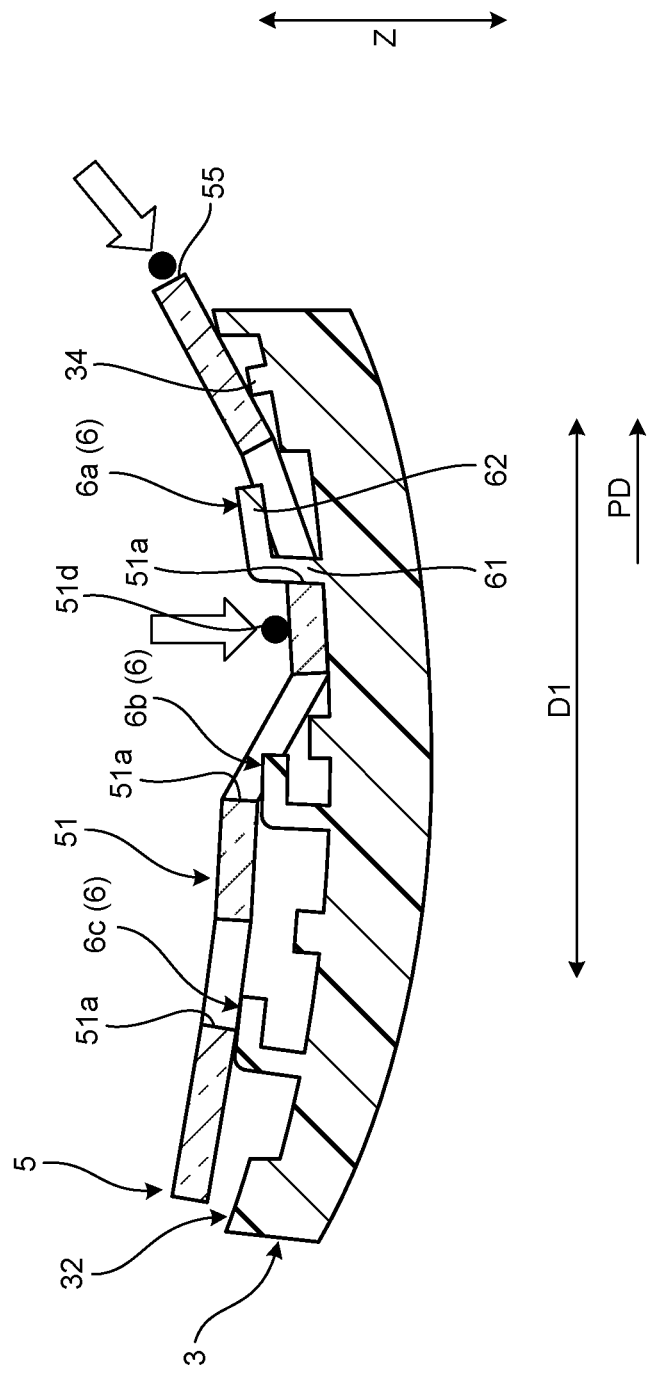
FIG. 10 is a sectional view for describing the attachment of the cover to the housing.
Figure 11:
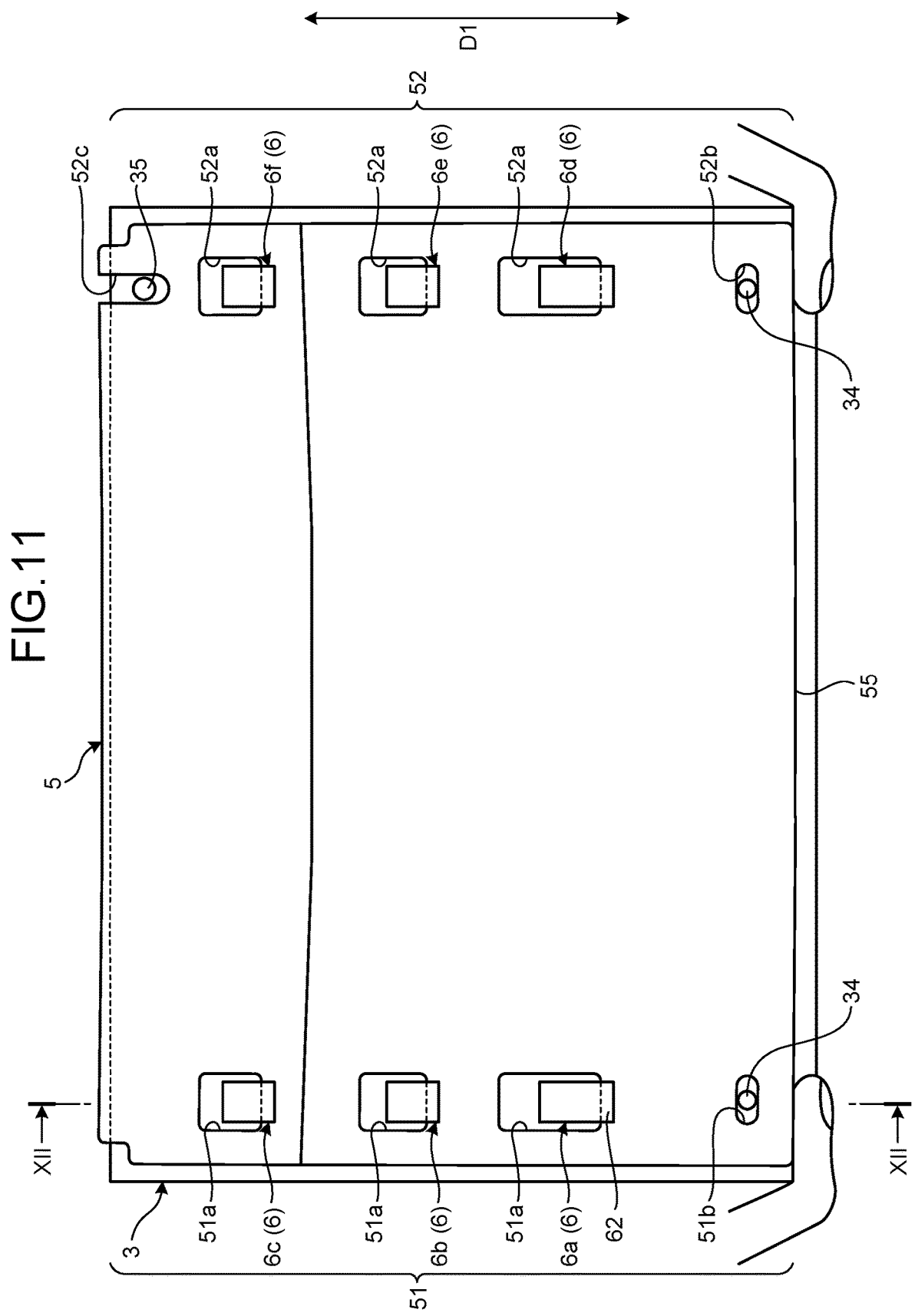
FIG. 11 is a plan view for describing the attachment of the cover to the housing.
Figure 12:
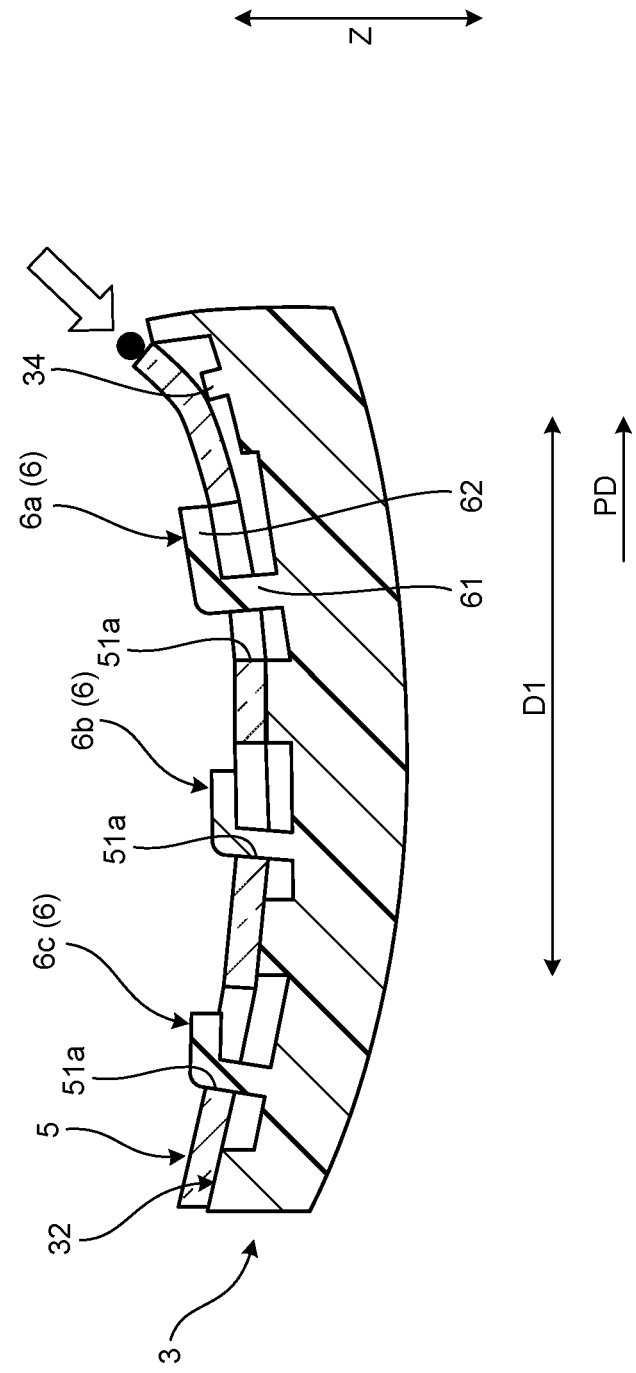
FIG. 12 is a sectional view for describing the attachment of the cover to the housing.

An embodiment is described with reference to FIG. 1 to FIG. 15. The present embodiment is related to a projection device. FIG. 1 is a perspective view of a projection device according to the embodiment. FIG. 2 is a schematic structure diagram of a vehicle where the projection device according to the embodiment is mounted. FIG. 3 is a plan view of a housing according to the embodiment. FIG. 4 is a side view of the housing according to the embodiment. FIG. 5 is a sectional view of the housing according to the embodiment. FIG. 6 is a plan view of a cover according to the embodiment. FIGS. 7, 9, and 11 are plan views for describing the attachment of the cover to the housing. FIGS. 8, 10, and 12 are sectional views for describing the attachment of the cover to the housing.

Figure 13:
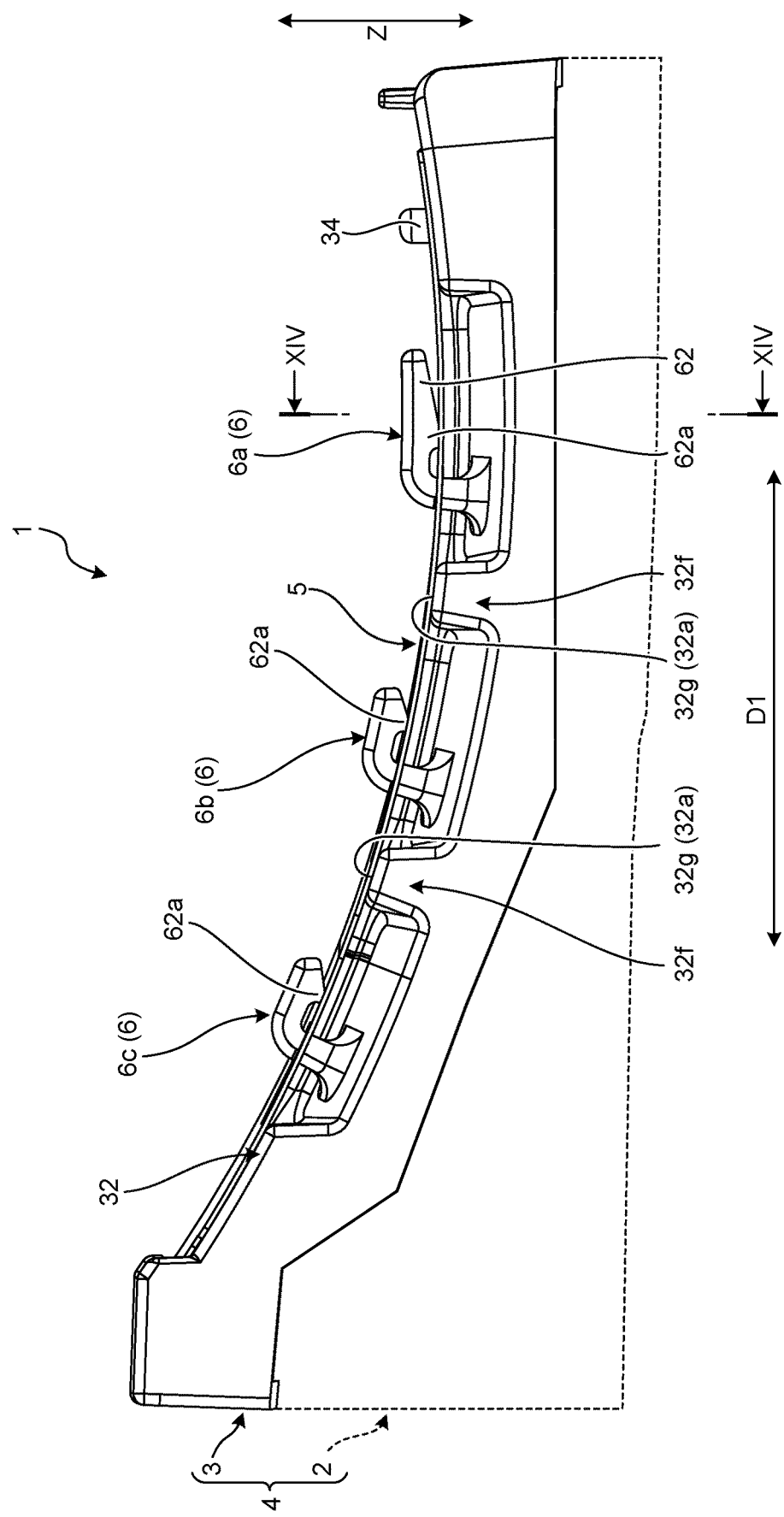
FIG. 13 is a side view illustrating the cover fixed to the housing.
Figure 14:
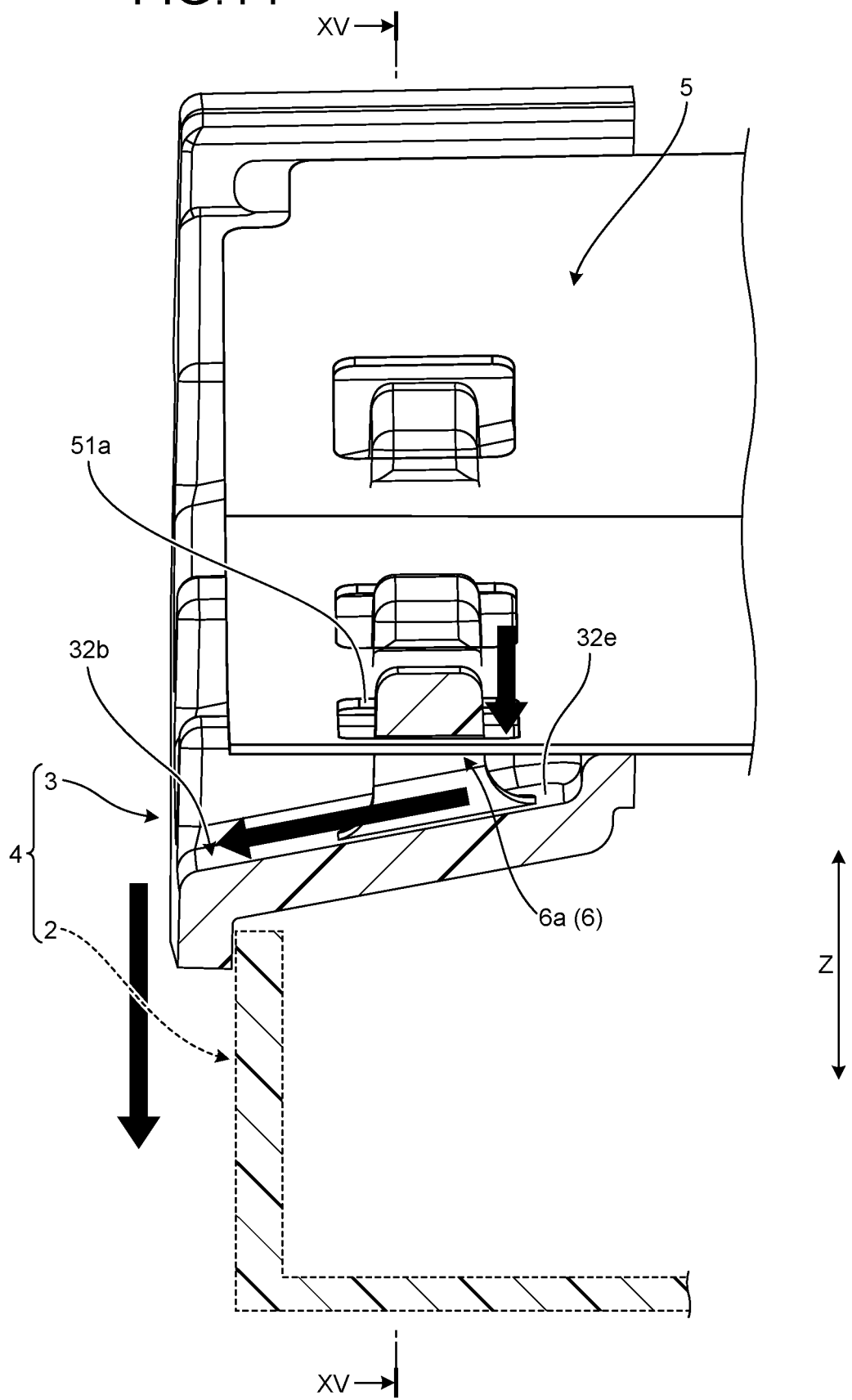
FIG. 14 is a sectional view illustrating a discharge route of a foreign substance.
Figure 15:
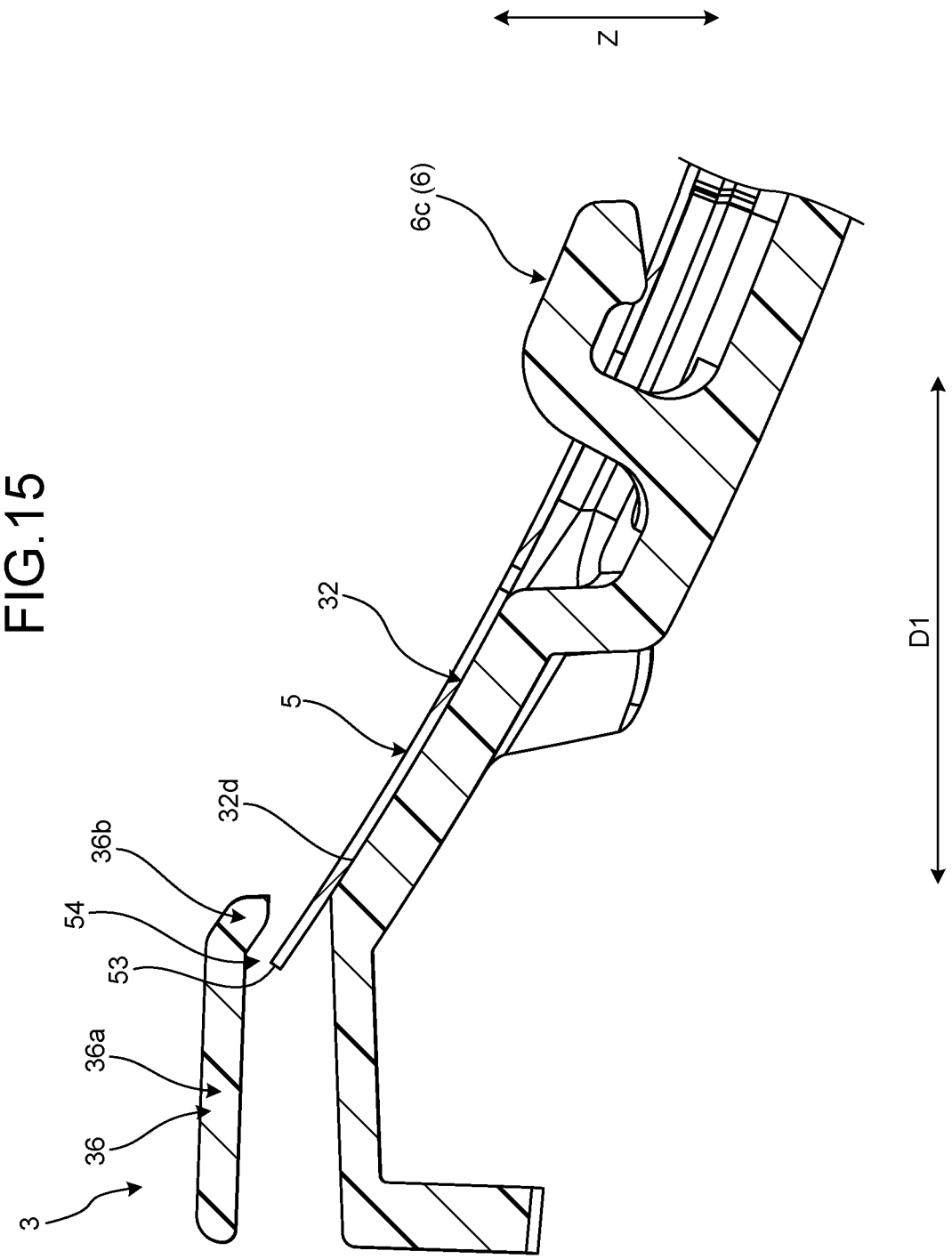
FIG. 15 is a sectional view illustrating the vicinity of a covering part.

FIG. 13 is a side view illustrating the cover fixed to the housing. FIG. 14 is a sectional view illustrating a discharge route of a foreign substance. FIG. 15 is a sectional view illustrating the vicinity of a covering part. FIG. 5 illustrates the section along V-V in FIG. 3. FIG. 8 illustrates the section along VIII-VIII in FIG. 7. FIG. 10 illustrates the section along X-X in FIG. 9. FIG. 12 illustrates the section along XII-XII in FIG. 11. FIG. 14 illustrates the section along XIV-XIV in FIG. 13. FIG. 15 illustrates the section along XV-XV in FIG. 14.

As illustrated in FIG. 1 and FIG. 2, a projection device 1 according to the present embodiment includes a housing 4 and a cover 5. The housing 4 includes a main body 2 and a lid member 3 that is fitted to the main body 2. The main body 2 includes an opening part that opens upward. The lid member 3 closes the opening part of the main body 2 from above.

As illustrated in FIG. 2, the projection device 1 according to the embodiment is mounted on a vehicle 100. The projection device 1 forms a head-up display. The projection device 1 is disposed inside an instrument panel 101, for example. The instrument panel 101 includes an opening 101a that opens upward. The opening 101a faces a windshield 102 in a vehicle up-down direction Z.

The lid member 3 includes a wall part 30 including an opening 31. The wall part 30 faces the opening part of the main body 2 in the vehicle up-down direction Z. The housing 4 is disposed such that the opening 31 faces the opening 101a. The housing 4 is disposed such that a first direction D1 to be described below extends along a vehicle front-rear direction X. The projection device 1 includes a display device 20, a first mirror 21, and a second mirror 22. The display device 20, the first mirror 21, and the second mirror 22 are housed inside the housing 4. The display device 20 is a device including a display surface for displaying an image. The display device 20 is, for example, a liquid crystal display device such as a thin film transistor-liquid crystal display (TFT-LCD).

The first mirror 21 reflects, toward the second mirror 22, display light 70 emitted from the display device 20. The first mirror 21 is a planar mirror, for example. The second mirror 22 reflects the display light 70 toward the windshield 102. The shape of the reflection surface of the second mirror 22 is, for example, a free curved surface. The second mirror 22 is, for example, a concave mirror for magnifying the display light 70.

The display light 70 reflected by the second mirror 22 passes through the opening 31 and the opening 101a, and is reflected toward a driver 200 by the windshield 102. The projection device 1 displays a virtual image to the driver 200 by the display light 70. In the instrument panel 101, a bezel 103 with a tubular shape is provided. The bezel 103 is a wall part that surrounds an optical path of the display light 70 propagating from the opening 31 to the opening 101a.

The cover 5 is a plate-shaped member that closes the opening 31 of the lid member 3. The cover 5 is formed of resin with a light-transmitting property such as polycarbonate (PC) or acrylic, for example. The cover 5 may be colorless and transparent, or colored and transparent. The cover 5 may have a surface coated for antireflection. The cover 5 covers the opening 31 from the outside so as to close the opening 31. The cover 5 in this example covers the opening 31 from above.

As illustrated in FIG. 1 and FIG. 3, the shape of the lid member 3 in a plan view is approximately rectangular. In the description below, the direction along one side of the lid member 3 is referred to as "first direction D1" and the direction along a side intersecting with this one side is referred to as "second direction D2". The first direction D1 and the second direction D2 are orthogonal to each other, for example. In the lid member 3 in this example, the first direction D1 corresponds to a short-side direction and the second direction D2 corresponds to a long-side direction.

The lid member 3 is formed of, for example, synthetic resin such as polypropylene or ABS. As illustrated in FIG. 1 and FIG. 3, the lid member 3 includes a first edge part 32 and a second edge part 33 that face each other with the opening 31 therebetween. The first edge part 32 and the second edge part 33 extend along the first direction D1. The first edge part 32 and the second edge part 33 face each other in the second direction D2.

As illustrated in FIG. 1 and FIG. 4, the first edge part 32 and the second edge part 33 are curved to the inside of the housing 4. FIG. 4 is a side view of the first edge part 32. The curved shape of the second edge part 33 is similar to the curved shape of the first edge part 32. As illustrated in FIG. 4, the first edge part 32 includes a support surface 32a the shape of which in a side view is an arc or similar to an arc. The support surface 32a is curved to the inside of the housing 4. The support surface 32a in this example is curved downward in the vehicle up-down direction Z. The support surface 32a includes a first end part 32c and a second end part 32d. The first end part 32c corresponds to one end part of the support surface 32a in the first direction D1. The second end part 32d corresponds to the other end part of the support surface 32a in the first direction D1.

FIG. 4 illustrates a virtual line IL1 connecting the first end part 32c and the second end part 32d of the support surface 32a. A central part 32m of the support surface 32a is positioned below the virtual line IL1. In other words, the support surface 32a is depressed such that the central part 32m is positioned closer to the main body 2 with respect to the central line IL1. The support surface 32a is inclined such that the second end part 32d is positioned higher than the first end part 32c.

The first edge part 32 includes a plurality of concave parts 32b. The concave parts 32b are depressed to the inside of the housing 4 with respect to the support surface 32a. The concave parts 32b are disposed at intervals along the first direction D1. The first edge part 32 in this example includes three concave parts 32b. As illustrated in FIG. 5, a bottom surface 32e of each of the concave parts 32b is inclined with respect to the second direction D2. The housing 4 is mounted on the vehicle 100 such that the second direction D2 coincides with the vehicle width direction. That is to say, the bottom surface 32e is an inclined surface that is inclined with respect to a horizontal direction in a state where the housing 4 is mounted on the vehicle 100. The bottom surface 32e is inclined in a manner of extending downward as the bottom surface 32e extends to the outside of the housing 4 along the second direction D2. Therefore, the bottom surface 32e is inclined so that liquid such as water is discharged to a space beside the housing 4.

Each concave part 23b includes one claw part 6. That is to say, the first edge part 32 in this example includes three claw parts 6. In the description below, the claw parts 6 are referred to as a first claw part 6a, a second claw part 6b, and a third claw part 6c in the order from the claw part 6 closest to the first end part 32c.

Each of the claw parts 6 protrudes upward from the bottom surface 32e of the concave part 32b. The claw part 6 includes a base part 61 and a holding part 62. The base part 61 protrudes from the bottom surface 32e to the outside of the housing 4. The claw part 6 in this example protrudes upward from the bottom surface 32e. The base part 61 protrudes from the bottom surface 32e to the vertical direction, for example. The shape of the base part 61 is, for example, a prismatic column shape having an approximately rectangular sectional shape.

The holding part 62 protrudes along the first direction D1 from a tip end part of the base part 61. In the housing 4 in this example, each holding part 62 protrudes from the base part 61 toward the first end part 32c. That is to say, the shape of the claw part 6 in the side view is an L-like shape in which the holding part 62 is bent toward the first end part 32c with respect to the base part 61. The holding part 62 protrudes to the direction parallel to the bottom surface 32e, for example. The shape of the holding part 62 is, for example, a prismatic column shape having an approximately rectangular sectional shape. The holding part 62 includes a convex part 62a. The convex part 62a rises to the bottom surface 32e. The shape of the convex part 62a in the side view is a triangular shape the width of which in the first direction D1 decreases toward the bottom surface 32e. The convex part 62a faces a central part of the bottom surface 32e in the first direction D1, for example. The holding part 62 supports the cover 5 by the convex part 62a.

As illustrated in FIG. 4, a length L1 of the holding part of the first claw part 6a is larger than a length L2 of the holding part 62 of the second claw part 6b and is larger than a length L3 of the holding part 62 of the third claw part 6c. That is to say, the length L1 of the holding part 62 of the first claw part 6a is larger than the lengths L2 and L3 of the holding part 62 of the claw parts 6b and 6c other than the first claw part 6a. In the present embodiment, the length L2 and the length L3 are the same.

The first edge part 32 includes a first protrusion 34. The first protrusion 34 is provided to the support surface 32a and protrudes upward from the support surface 32a. The first protrusion 34 is disposed near the first end part 32c. More specifically, the first protrusion 34 is disposed between the concave part 32b where the first claw part 6a is disposed and the first end part 32c. The shape of the first protrusion 34 in this example is a circular column.

The adjacent concave parts 32b are partitioned by a partition wall 32f. An upper surface 32g of the partition wall 32f constitutes a part of the support surface 32a. That is to say, the adjacent two concave parts 32b and 32b are formed in a manner that the support surface 32a is left between the concave parts 32b and 32b.

As illustrated in FIG. 3, the second edge part 33 includes a support surface 33a and a plurality of concave parts 33b. The shape of the support surface 33a is similar to the shape of the support surface 32a of the first edge part 32. That is to say, the shape of the support surface 33a is a curved shape that is curved to the inside of the housing 4. The support surface 33a includes a first end part 33c and a second end part 33d. The first end part 33c is positioned on the same side as the first end part 32c in the first direction D1. The support surface 33a is inclined such that the second end part 33d is positioned higher than the first end part 33c.

The concave parts 33b are disposed at intervals along the first direction D1. The second edge part 33 in this example includes three concave parts 33b. A bottom surface 33e of each of the concave parts 33b is inclined with respect to the second direction D2. The bottom surface 33e is inclined in a manner of extending downward as the bottom surface 33e extends away from the first edge part 32. Therefore, the bottom surface 33e is inclined so that liquid such as water is discharged to a space beside the housing 4.

Each concave part 33b includes one claw part 6. In the description below, the claw parts 6 of the second edge part 33 are referred to as a first claw part 6d, a second claw part 6e, and a third claw part 6f in the order from the claw part 6 closest to the first end part 33c.

Each of the claw parts 6 protrudes upward from the bottom surface 33e of the concave part 33b. The first claw part 6d is disposed facing the first claw part 6a in the second direction D2. Similarly, the second claw part 6e and the third claw part 6f are disposed facing the second claw part 6b and the third claw part 6c, respectively.

The claw part 6 of the second edge part 33 includes the base part 61 and the holding part 62 similar to those of the claw part 6 of the first edge part 32. The holding part 62 protrudes along the first direction D1 from a tip end part of the base part 61. Each holding part 62 protrudes from the base part 61 toward the first end part 33c side. The holding part 62 includes the convex part 62a. In the claw parts 6 of the second edge part 33, the length of the holding part 62 of the first claw part 6d is larger than the length of the holding parts 62 of the other claw parts 6e and 6f. The length of the holding part 62 of the first claw part 6d is equal to the length L1 of the holding part 62 of the first claw part 6a, for example. The length of the holding part 62 of the second claw part 6e and the length of the holding part 62 of the third claw part 6f are equal to the length L2 of the holding part 62 of the second claw part 6b and the length L3 of the holding part 62 of the third claw part 6c, for example.

The second edge part 33 includes the first protrusion 34. The first protrusion 34 is provided to the support surface 33a and protrudes upward from the support surface 33a. The first protrusion 34 is disposed near the first end part 33c. More specifically, the first protrusion 34 is disposed between the concave part 33b where the first claw part 6d is disposed and the first end part 33c. The shape of the first protrusion 34 is a circular column, for example.

The second edge part 33 includes a second protrusion 35. The second protrusion 35 is provided to the support surface 33a and protrudes upward from the support surface 33a. The second protrusion 35 is disposed near the second end part 33d. More specifically, the second protrusion 35 is disposed between the concave part 33b where the third claw part 6f is disposed and the second end part 33d. The shape of the second protrusion 35 is a circular column, for example.

As illustrated in FIG. 6, the shape of the cover 5 in a plan view is approximately rectangular. The cover 5 includes a first edge part 51 and a second edge part 52. The first edge part 51 is an edge part corresponding to the first edge part 32 of the lid member 3. The second edge part 52 is an edge part corresponding to the second edge part 33 of the lid member 3. The first edge part 51 and the second edge part 52 extend in the first direction D1 in a state where the cover 5 is attached to the lid member 3. The first edge part 51 and the second edge part 52 are parallel to each other, for example. In the long-side direction of the cover 5 in this example, the direction where the first edge part 51 and the second edge part 52 extend corresponds to the short-side direction.

The first edge part 51 includes a plurality of through holes 51a. The through holes 51a are disposed at intervals in the direction where the first edge part 51 extends. The distance between the adjacent through holes 51a and 51a corresponds to the distance between the claw parts 6 of the first edge part 32. The shape of the through hole 51a in this example is rectangular. The through hole 51a has the width and the length that enable at least the holding part 62 of the corresponding claw part 6 to be inserted thereinto. A length L4 of the through hole 51a corresponding to the first claw part 6a is larger than lengths L5 and L6 of the other through holes 51a.

The first edge part 51 includes a positioning hole 51b. The positioning hole 51b corresponds to the first protrusion 34 provided to the first edge part 32. The positioning hole 51b is provided to one end of the first edge part 51 in the first direction D1. The positioning hole 51b is a through hole penetrating the cover 5. The shape of the positioning hole 51b in a plan view is an ellipse the major axis of which coincides with the direction orthogonal to the first direction D1.

The second edge part 52 includes a plurality of through holes 52a. The through holes 52a are disposed at intervals in the direction where the second edge part 52 extends. The distance between the adjacent through holes 52a corresponds to the distance between the claw parts 6 of the second edge part 33. The shape of the through hole 52a in this example is rectangular. The through hole 52a has the width and the length that enable at least the holding part 62 of the corresponding claw part 6 to be inserted thereinto. The length of the through hole 52a corresponding to the first claw part 6d is larger than the lengths of the other through holes 52a.

The second edge part 52 includes a positioning hole 52b. The positioning hole 52b corresponds to the first protrusion 34 provided to the second edge part 33. The positioning hole 52b is provided to one end of the second edge part 52 in the first direction D1. The positioning hole 52b is a through hole penetrating the cover 5. The shape of the positioning hole 52b in a plan view is an ellipse the major axis of which coincides with the direction orthogonal to the first direction D1.

The second edge part 52 includes a notch 52c. The notch 52c guides the second protrusion 35 of the lid member 3 so as to position the cover 5 with respect to the lid member 3. The notch 52c is provided to a first side 54 of the cover 5.

The first side 54 is a side facing toward a direction opposite to a protruding direction PD in which the holding parts 62 protrude. The notch 52c extends along the first direction D1. The width of the notch 52c is a little larger than the outer diameter of the second protrusion 35. The shape of a depth part of the notch 52c is an arc matching the shape of the second protrusion 35.

Here, a method for attaching the cover 5 to the lid member 3 is described. An operator positions the cover 5 to the lid member 3 as illustrated in FIG. 7 and FIG. 8. More specifically, the cover 5 is positioned such that the first edge part 51 faces the first edge part 32 of the lid member 3 and the second edge part 52 faces the second edge part 33 of the lid member 3. Here, the three through holes 51a face the claw parts 6a, 6b, and 6c of the lid member 3 respectively, and the three through holes 52a face the claw parts 6d, 6e, and 6f of the lid member 3 respectively.

Next, the operator inserts the first claw parts 6a and 6d to the corresponding through holes 51a and 52a as illustrated in FIG. 9 and FIG. 10. The operator places his/her finger on a second side 55 of the cover 5 and presses points 51d and 52d near the through holes 51a and 52a toward the lid member 3. FIG. 10 illustrates the sections of the first edge part 32 of the lid member 3 and the first edge part 51 of the cover 5. As the point 51d is pressed and the cover 5 is curved accordingly, the first claw part 6a is inserted into the corresponding through hole 51a. At this time, the second claw part 6b and the third claw part 6c are deviated from the corresponding through holes 51a. Therefore, the second claw part 6b and the third claw part 6c are in contact with a back surface of the cover 5.

The second edge part 33 of the lid member 3 and the second edge part 52 of the cover 5 are also in the similar state. That is to say, the first claw part 6d is inserted into the corresponding through hole 52a and the second claw part 6e and the third claw part 6f are in contact with the back surface of the cover 5.

The operator further slides the cover 5 toward a direction opposite to the protruding direction PD. Thus, the cover 5 goes under the holding parts 62 of the first claw parts 6a and 6d. At this time, the second claw parts 6b and 6e and the third claw parts 6c and 6f remain in contact with the back surface of the cover 5. The holding parts 62 of the first claw parts 6a and 6d hold the cover 5 and temporarily lock the cover 5. Thus, the operator can easily keep the cover 5 curved. Accordingly, the operator can easily insert the other claw parts 6b, 6c, 6e, and 6f into the through holes 51a and 52a.

The operator further slides the cover 5 in the direction opposite to the protruding direction PD. Thus, the cover 5 goes under the holding parts 62 of the second claw parts 6b and 6e and under the holding parts 62 of the third claw parts 6c and 6f as illustrated in FIG. 11 and FIG. 12. FIG. 12 illustrates the state in which the cover 5 slides to the space below the second claw parts 6b and 6e and the third claw parts 6c and 6f. FIG. 11 illustrates the state in which the cover 5 has gone under the second claw parts 6b and 6e and the third claw parts 6c and 6f.

The operator further slides the cover 5 in the direction opposite to the protruding direction PD. Thus, the cover 5 is kept at a predetermined holding position as illustrated in FIG. 13. At the holding position illustrated in FIG. 13, the lid member 3 holds the cover 5 between the first edge part 32 and the holding parts 62 inserted into the through hole 51a in a manner that the cover 5 is curved. More specifically, the lid member 3 holds the cover 5 between the convex parts 62a of the holding parts 62 and the support surface 32a. The cover 5 is held in a manner of being curved along the support surface 32a. That is to say, the cover 5 is held between the support surface 32a and the holding parts 62 by the elastic restoring force of the cover 5.

Note that the lid member 3 holds the cover 5 between the second edge part 33 and the claw parts 6 similarly as described above. That is to say, at the holding position, the lid member 3 holds the cover 5 between the second edge part 33 and the holding parts 62 inserted into the through holes 52a in a manner that the cover 5 is curved. More specifically, the lid member 3 holds the cover 5 between the convex parts 62a of the holding parts 62 and the support surface 33a. The cover 5 is held in a manner of being curved along the support surface 33a. That is to say, the cover 5 is held between the support surface 33a and the holding parts 62 by the elastic restoring force of the cover 5.

At the holding position, the first protrusion 34 protrudes from the cover 5 as illustrated in FIG. 13. As illustrated in FIG. 1, the two first protrusions 34 of the lid member 3 are inserted into the positioning holes 51b and 52b. In other words, the first protrusions 34 are fitted to the positioning holes 51b and 52b. The first protrusions 34 restrict the movement of the cover 5 along the first direction D1 and position the cover 5. Moreover, at the holding position, the second protrusion 35 of the lid member 3 enters the notch 52c of the cover 5 as illustrated in FIG. 1. The second protrusion 35 restricts the movement of the cover 5 along the second direction D2 and positions the cover 5. The cover 5 is held by the lid member 3 at a predetermined position and is fixed to the lid member 3.

In the projection device 1 according to the present embodiment, the entry of foreign substances into the housing 4 can be suppressed as described below. As illustrated in FIG. 14, a foreign substance such as liquid may drop into the concave part 32b from the gap between the claw part 6 and the through hole 51a. As described above, the bottom surface 32e of the concave part 32b is inclined so that the foreign substance is discharged to the space beside the housing 4. Thus, the foreign substance having entered the concave part 32b is discharged to the space beside the housing 4. The three sides of the concave part 32b other than the discharge port are surrounded by walls. Thus, the entry of the foreign substances into the housing 4 is suppressed as appropriate. Similarly, the foreign substance having entered through the gap between the claw part 6 and the through hole 52a is discharged to the space beside the housing 4 by the bottom surface 33e of the concave part 33b.

The projection device 1 according to the present embodiment includes a covering part 36 that covers an end face 53 of the cover 5 as illustrated in FIG. 15. The covering part 36 constitutes a part of the lid member 3, and is formed integrally with the first edge part 32 and the second edge part 33. The end face 53 of the cover 5 is an end face positioned at the first side 54. When the cover 5 is held by the lid member 3, the end face 53 faces obliquely upward.

As illustrated in FIG. 4, one end of the covering part 36 in the second direction D2 connects to the first edge part 32. The other end of the covering part 36 in the second direction D2 connects to the second edge part 33. That is to say, the covering part 36 continues from one end to the other end of the lid member 3 in the second direction D2.

As illustrated in FIG. 15, the covering part 36 includes a main body 36a and an inclination part 36b. The main body 36a is a flat-plate part and extends approximately horizontally. The inclination part 36b extends obliquely downward from a tip end of the main body 36a. The inclination angle of the inclination part 36b with respect to the first direction D1 is similar to the inclination angle of the cover 5 with respect to the first direction D1. When the cover 5 is held by the lid member 3, the inclination part 36b overlaps with the first side 54 of the cover 5. In other words, an end part of the cover 5 that includes the first side 54 is covered with the inclination part 36b.

The lid member 3 is configured such that when the cover 5 is attached to the lid member 3, the first side 54 goes under the covering part 36. More specifically, there is a gap below the covering part 36 and the cover 5 can enter this gap. When the cover 5 is attached to the lid member 3, the end part of the cover 5 goes under the covering part 36 while sliding along the first edge part 32 and the second edge part 33.

The covering part 36 is configured to suppress the generation of stray light. For example, when external light such as sunlight is reflected by the end face 53, stray light is generated and the visibility of an image may deteriorate. In this regard, the covering part 36 can shield the end face 53 from the external light and suppress the generation of the stray light.

In the lid member 3 according to the present embodiment, the covering part 36 is formed integrally with the first edge part 32 and the second edge part 33. Therefore, an additional member for shielding the end face 53 from light is unnecessary, the number of components is reduced, and the workability of the assembling work is improved. Moreover, the size of the cover 5 can be reduced to minimize the size of the projection device 1. Furthermore, the shape and the depth of the bezel 103 do not need to be adjusted for preventing stray light and the limitation on the design on the vehicle 100 side is removed. The lid member 3 may include, in addition to the covering part 36 that covers the end face 53, a covering part that covers end faces of the first edge part 51 and the second edge part 52.

As described above, the projection device 1 according to the present embodiment includes the housing 4 and the plate-shaped cover 5. The housing 4 includes the wall part 30 including the opening 31. The opening 31 allows the display light 70 to pass toward the outside. The cover 5 has a light-transmitting property and closes the opening 31 from the outside. The wall part 30 includes the first edge part 32, the second edge part 33, and the claw parts 6. The first edge part 32 and the second edge part 33 are a pair of edge parts facing each other with the opening 31 therebetween and extending along the first direction D1. The claw parts 6 are arranged along the first direction D1 at the first edge part 32 and the second edge part 33.

The first edge part 32 and the second edge part 33 are curved to the inside of the housing 4. The cover 5 includes the through holes 51a and 52a arranged correspondingly to the claw parts 6. Each of the claw parts 6 includes the base part 61 and the holding part 62. The base part 61 protrudes from the first edge part 32 or the second edge part 33 to the outside. The holding part 62 protrudes from the tip end part of the base part 61 along the first direction D1. The housing 4 holds the cover 5 between the holding parts 62 inserted into the through holes 51a and 52a and the edge parts 32 and 33 in a manner that the cover 5 is curved.

In the projection device 1 according to the present embodiment, the cover 5 is held between the holding parts 62 and the edge parts 32 and 33. Thus, the cover 5 can be fixed to the housing 4 without the use of an adhesive agent or an adhesive tape. Therefore, the projection device 1 according to the present embodiment can reduce the number of components. In the case of fixing the cover 5 to the housing 4 with an adhesive agent, a material that is not deformed easily at the contact with the adhesive agent needs to be selected as the material of the cover 5. That is to say, the material of the cover 5 is likely to be restricted. On the other hand, in the projection device 1 according to the present embodiment, the material of the cover 5 is not likely to be restricted.

Moreover, since the cover 5 is held by the claw parts 6, the expansion and contraction of the cover 5 due to heat are easily allowed. For example, when the cover 5 is fixed to the housing 4 with an adhesive agent, the cover 5 may distort due to the expansion and contraction of the cover 5. The claw parts 6 allow the expansion and contraction of the cover 5 and can suppress the distortion of the cover 5.

In the projection device 1 according to the present embodiment, the claw parts 6 disposed along the edge parts 32 and 33 include the first claw parts 6a and 6d positioned at the end part in the first direction D1. The length of the holding parts 62 of the first claw parts 6a and 6d is larger than the length of the holding parts 62 of the claw parts 6 other than the first claw parts 6a and 6d. For example, the length L1 of the holding part 62 of the first claw part 6a is larger than the lengths L2 and L3 of the holding parts 62 of the other claw parts 6. Therefore, the first claw parts 6a and 6d can be used as the holding parts with respect to the cover 5 and the workability of the assembling work is improved.

The first claw parts 6a and 6d according to the present embodiment are positioned at an end part in the protruding direction PD. The protruding direction PD corresponds to the direction where the holding part 62 protrudes. With this structure, the operator can make the first claw parts 6a and 6d positioned at the leading end in the protruding direction PD hold the cover 5.

The cover 5 according to the present embodiment includes the first side 54. The first side 54 is a side facing toward a direction opposite to the protruding direction PD. The housing 4 includes the covering part 36 covering the first side 54 in a state where the cover 5 is held by the holding parts 62 and the edge parts 32 and 33. Therefore, the housing 4 can suppress the generation of stray light.

The cover 5 according to the present embodiment includes the positioning holes 51b and 52b. The housing 4 includes the first protrusions 34. The first protrusions 34 are fitted to the positioning holes 51b and 52b in the state where the cover 5 is held by the holding parts 62 and the edge parts 32 and 33. With this structure, the cover 5 can be positioned and the displacement of the cover 5 can be suppressed.

The cover 5 according to the present embodiment includes the notch 52c provided to the first side 54. The housing 4 includes the second protrusion 35 that locks the notch 52c to position the cover 5. The second protrusion 35 locks the notch 52c in the second direction D2, for example. With this structure, the cover 5 can be positioned and the displacement of the cover 5 can be suppressed.

Modification of Embodiment

Figure 16:
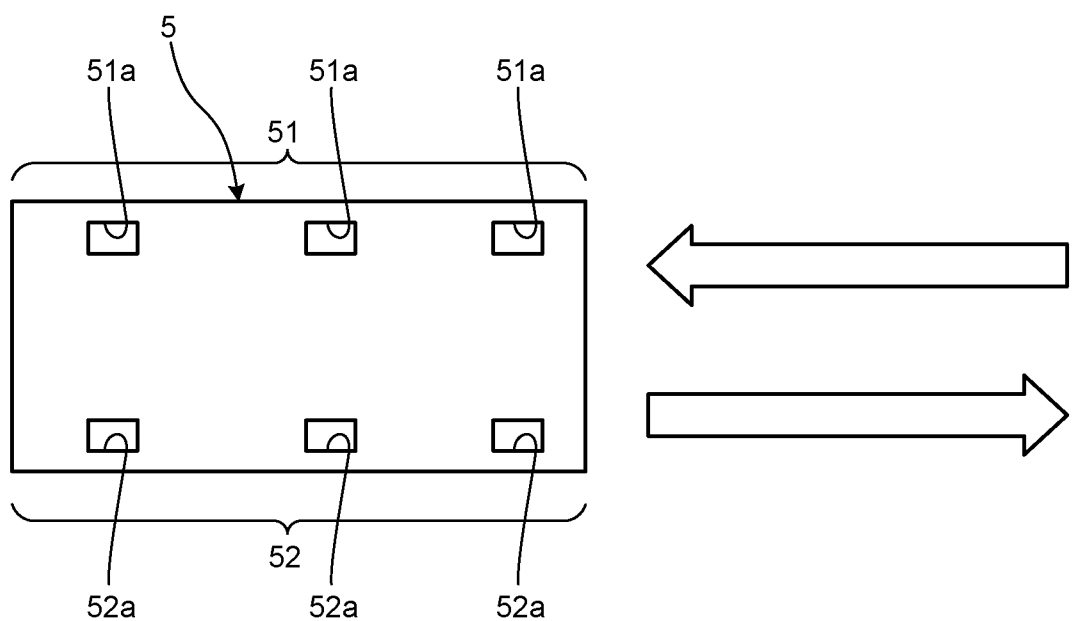
FIG. 16 is a plan view of a cover according to a modification of the embodiment.

FIG. 16 is a plan view of a cover according to a modification of the embodiment. The sliding direction when the cover 5 is assembled to the lid member 3 is not limited to the direction illustrated in the embodiment. In the example in FIG. 3, the sliding direction of the cover 5 may be a direction from the second end parts 32d and 33d of the lid member 3 to the first end parts 32c and 33c. The protruding direction PD in this case is opposite to the direction in FIG. 3. The sliding direction of the cover 5 may be parallel to the long-side direction of the lid member 3. In this case, the first edge part 51 and the second edge part 52 are edge parts extending along the long-side direction of the cover 5 as illustrated in FIG. 16. The through holes 51a and 52a are arranged along the long-side direction of the cover 5. The claw parts 6 are arranged at edge parts along the long-side direction of the lid member 3.

The positions of the first claw parts 6a and 6d are not limited to the positions illustrated in the embodiment. For example, the first claw parts 6a and 6d are positioned at the end parts on the side of the first end parts 32c and 33c in the aforementioned embodiment. Alternatively, the first claw parts 6a and 6d may be positioned at the end parts on the side of the second end parts 32d and 33d. For example, the positions of the first claw parts 6a and 6d are not limited to the end positions among the claw parts 6.

The number of claw parts 6 is not limited to the number in the drawings. For example, each of the first edge part 32 and the second edge part 33 may include one claw part 6. In this case, the one claw part 6 may be disposed so as to support a central part of the cover 5 in the first direction D1. Both end parts of the cover 5 are supported by the support surfaces 32a and 33a, for example. Each of the first edge part 32 and the second edge part 33 may include four or more claw parts 6.

The distance between the claw parts 6 is not limited to the distance illustrated in the example. The claw parts 6 may be arranged such that the base parts 61 are disposed at equal intervals, for example. The first claw parts 6a and 6d may be disposed with a distance different from the distance between the other claw parts 6. For example, the distance from the first claw parts 6a and 6d to the second claw parts 6b and 6e may be different from the distance from the second claw parts 6b and 6e to the third claw parts 6c and 6f. The claw parts 6 are arranged depending on the shape of the housing 4 to improve the assembling property.

In the aforementioned embodiment, the length of the holding parts 62 of the first claw parts 6a and 6d is larger than the length of the holding parts 62 of the other claw parts 6; however, the structure is not limited to this example. For example, all the holding parts 62 may have an equal length.

Figure 17:
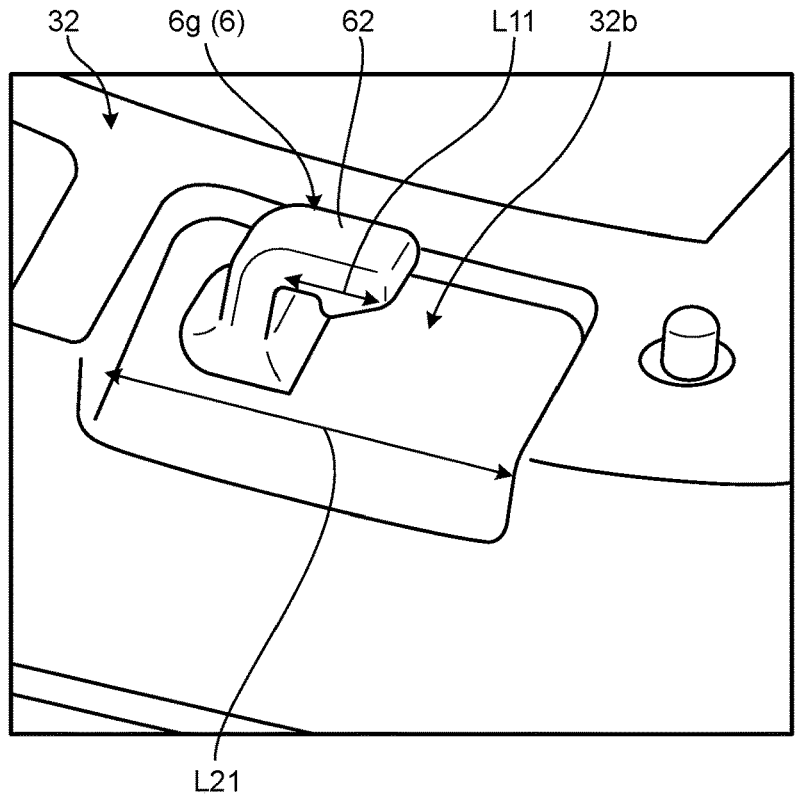
FIG. 17 is a perspective view of a first claw part and a concave part according to the modification of the embodiment.
Figure 18:
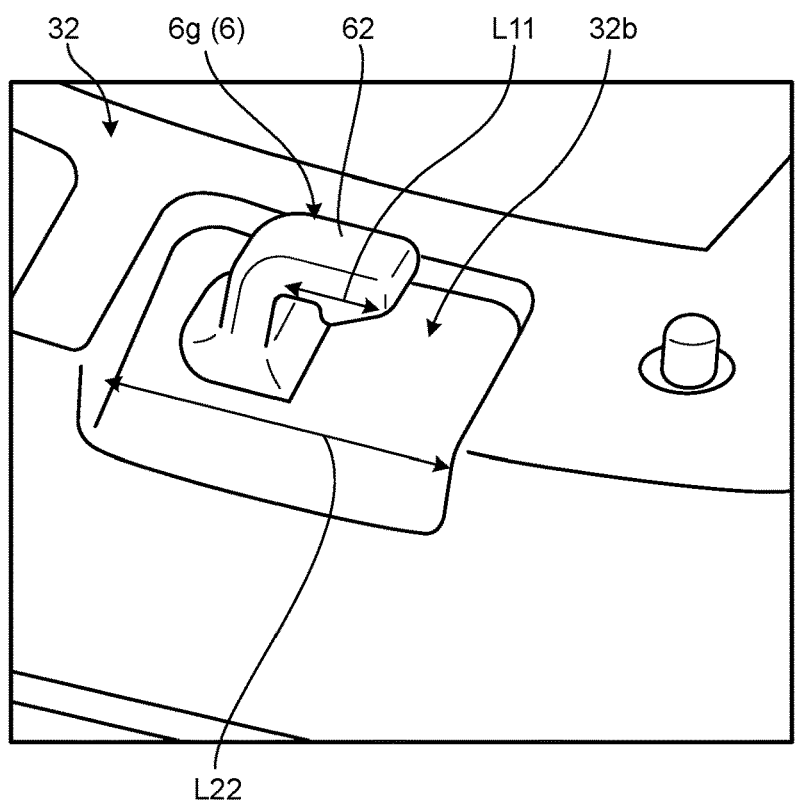
FIG. 18 is a perspective view of another concave part according to the modification of the embodiment.

The holding part 62 of the first claw part may be shorter than the holding parts 62 of the other claw parts 6. FIG. 17 is a perspective view of a first claw part and a concave part according to the modification of the embodiment. FIG. 18 is a perspective view of another concave part according to the modification of the embodiment. A first claw part 6g illustrated in FIG. 17 is a modification of the first claw part 6a of the embodiment. A length L11 of the holding part 62 of the first claw part 6g is smaller than the length L2 of the holding part 62 of the second claw part 6b and the length L3 of the holding part 62 of the third claw part 6c. A length L21 of the concave part 32b where the first claw part 6g is disposed may be equal to the length of the concave part 32b where the first claw part 6a is disposed. In this case, the length L21 is larger than the length of the concave parts 32b where the second claw part 6b and the third claw part 6c are disposed.

In the case where the holding part 62 of the first claw part 6g is short as illustrated in FIG. 17, the corresponding through hole 51a may also be short. For example, the length L4 (refer to FIG. 6) of the through hole 51a corresponding to the first claw part 6g is smaller than the lengths L5 and L6 of the other through holes 51a.

Note that the length of the concave part 32b where the first claw part 6g is disposed may be set in accordance with the length L11 of the holding part 62 of the first claw part 6g. A length L22 of the concave part 32b illustrated in FIG. 18 is smaller than the length of the concave parts 32b where the second claw part 6b and the third claw part 6c are disposed.

In this manner, the length of the concave part 32b may be set in accordance with the length of the holding part 62 disposed in the concave part 32b. The length of the concave part 32b is determined depending on the lengths L4, L5, and L6 of the corresponding through holes 51a. That is to say, the length of the concave part 32b is determined so that a foreign substance entering through the through hole 51a can be discharged by the concave part 32b.

The length of the holding part 62 of the first claw part 6d at the second edge part 33 may be equal to the length L11 of the holding part 62 of the first claw part 6g. The length of the concave part 32b where the first claw part 6d is disposed may be equal to either the length L21 or the length L22.

The number of first protrusions 34 and the number of second protrusions 35 are not limited to the numbers illustrated in the drawings. For example, the second protrusion 35 may be provided to the first edge part 32 in addition to the second edge part 33. In this case, the cover 5 includes two notches 52c.

The projection device 1 is not limited to a so-called head-up display. The structure of the housing 4 and the cover 5 is applicable to various devices that project images.

The contents disclosed in the aforementioned embodiment and modification can be implemented in combination as appropriate.

The projection device according to the embodiment includes the housing including the wall part including the opening, and the cover with the plate shape having a light-transmitting property and closing the opening from the outside. The wall part includes a pair of edge parts extending along the first direction, and the claw parts disposed along the first direction at each of the pair of edge parts. The pair of edge parts is curved to the inside of the housing. The cover includes the through holes disposed correspondingly to the claw parts. Each of the claw parts includes the base part and the holding part protruding from the tip end part of the base part along the first direction. The housing sandwiches the cover between the edge parts and the holding parts inserted into the through holes and holds the cover in a state where the cover is curved. The projection device according to the embodiment is advantageous in that the projection device can be configured with fewer components.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection device comprising:
a housing including a wall part including an opening that allows display light to pass toward outside; and
a cover with a plate shape having a light-transmitting property and closing the opening from the outside, wherein
the wall part includes a pair of edge parts facing each other with the opening therebetween and extending along a first direction, and a plurality of claw parts disposed along the first direction at each of the pair of edge parts,
the pair of edge parts is curved to inside of the housing,
the cover includes a plurality of through holes disposed correspondingly to the claw parts,
each of the claw parts includes a base part protruding from the edge part toward the outside and a holding part protruding from a tip end part of the base part along the first direction, and
the housing sandwiches the cover between the edge parts and the holding parts inserted into the through holes and holds the cover in a state where the cover is curved.

2. The projection device according to claim 1, wherein the claw parts disposed along each of the edge parts include a first claw part positioned at an end part in the first direction, and
a length of the holding part of the first claw part is larger than a length of the holding part of the claw part other than the first claw part.

3. The projection device according to claim 2, wherein the first claw part is positioned at an end part in a protruding direction in which the holding part protrudes.

4. The projection device according to claim 1, wherein the cover includes a first side that is a side facing toward a direction opposite to a protruding direction in which the holding part protrudes, and
the housing includes a covering part that covers the first side in a state where the cover is held by the holding parts and the edge parts.

5. The projection device according to claim 2, wherein the cover includes a first side that is a side facing toward a direction opposite to a protruding direction in which the holding part protrudes, and
the housing includes a covering part that covers the first side in a state where the cover is held by the holding parts and the edge parts.

6. The projection device according to claim 3, wherein the cover includes a first side that is a side facing toward a direction opposite to a protruding direction in which the holding part protrudes, and
the housing includes a covering part that covers the first side in a state where the cover is held by the holding parts and the edge parts.

7. The projection device according to claim 1, wherein the cover includes a positioning hole, and
the housing includes a first protrusion to be fitted to the positioning hole in a state where the cover is held by the holding parts and the edge parts.

8. The projection device according to claim 2, wherein the cover includes a positioning hole, and
the housing includes a first protrusion to be fitted to the positioning hole in a state where the cover is held by the holding parts and the edge parts.

9. The projection device according to claim 3, wherein the cover includes a positioning hole, and
the housing includes a first protrusion to be fitted to the positioning hole in a state where the cover is held by the holding parts and the edge parts.

10. The projection device according to claim 4, wherein the cover includes a positioning hole, and
the housing includes a first protrusion to be fitted to the positioning hole in a state where the cover is held by the holding parts and the edge parts.

11. The projection device according to claim 5, wherein the cover includes a positioning hole, and
the housing includes a first protrusion to be fitted to the positioning hole in a state where the cover is held by the holding parts and the edge parts.

12. The projection device according to claim 6, wherein the cover includes a positioning hole, and
the housing includes a first protrusion to be fitted to the positioning hole in a state where the cover is held by the holding parts and the edge parts.

13. The projection device according to claim 1, wherein
the cover includes a notch provided at a first side that is
a side facing toward a direction opposite to a protruding
direction in which the holding part protrudes, and
the housing includes a second protrusion that locks the
notch so as to position the cover.

14. The projection device according to claim 2, wherein
the cover includes a notch provided at a first side that is
a side facing toward a direction opposite to a protruding
direction in which the holding part protrudes, and
the housing includes a second protrusion that locks the
notch so as to position the cover.

15. The projection device according to claim 3, wherein
the cover includes a notch provided at a first side that is
a side facing toward a direction opposite to a protruding
direction in which the holding part protrudes, and
the housing includes a second protrusion that locks the
notch so as to position the cover.

16. The projection device according to claim 4, wherein
the cover includes a notch provided at a first side that is
a side facing toward a direction opposite to a protruding
direction in which the holding part protrudes, and
the housing includes a second protrusion that locks the
notch so as to position the cover.

17. The projection device according to claim 5, wherein
the cover includes a notch provided at a first side that is
a side facing toward a direction opposite to a protruding
direction in which the holding part protrudes, and
the housing includes a second protrusion that locks the
notch so as to position the cover.

18. The projection device according to claim 6, wherein
the cover includes a notch provided at a first side that is
a side facing toward a direction opposite to a protruding
direction in which the holding part protrudes, and
the housing includes a second protrusion that locks the
notch so as to position the cover.

19. The projection device according to claim 7, wherein
the cover includes a notch provided at a first side that is
a side facing toward a direction opposite to a protruding
direction in which the holding part protrudes, and
the housing includes a second protrusion that locks the
notch so as to position the cover.

20. The projection device according to claim 8, wherein
the cover includes a notch provided at a first side that is
a side facing toward a direction opposite to a protruding
direction in which the holding part protrudes, and
the housing includes a second protrusion that locks the
notch so as to position the cover.

\* \* \* \* \*